United States Patent Office 2,750,324
Patented June 12, 1956

2,750,324

METHOD OF KILLING ARTHROPOD PESTS AND COMPOSITION THEREFOR

Harry Bender, Torrance, Calif., assignor to Stauffer Chemical Company, a corporation of Delaware No Drawing. Application June 19, 1952, Serial No. 294,490

12 Claims. (Cl. 167—30)

This patent application is a continuation-in-part of three patent applications heretofore filed by me namely: Serial No. 224,679, filed May 4, 1951; Serial No. 132,807, filed December 13, 1949, both now abandoned, and Serial No. 105,273, filed July 16, 1949.

The invention relates broadly to pest control materials and particularly relates to materials for killing arthropods such as insects, mites, ticks and spiders which belong to the classes Insecta and Arachnida. In a more restricted sense the present invention relates to materials which are miticides.

In my application Serial No. 105,273 I disclosed that 4-chlorophenyl phenyl sulfone is effective in killing mites and in my application Serial No. 132,807 that 4-bromophenyl phenyl sulfone was also effective for this purpose. In my application Serial No. 224,679 I disclosed that 4-chlorophenyl phenyl sulfone had enhanced activity if applied in admixture with diphenyl sulfone, with bis(4-chlorophenyl) sulfone or mixtures of these compounds. I further disclosed that the bromo compounds could be substituted for the chloro compounds. In addition, it was disclosed that certain of the mixtures, hereinafter discussed in greater detail, have insecticidal as well as miticidal activity.

Stated in other terms, the invention contemplates the use of 4-chlorophenyl phenyl sulfone or 4-bromophenyl phenyl sulfone as a miticide and the addition to either of these materials of either diphenyl sulfone or bis(4-chlorophenyl) sulfone or mixtures of these last two compounds. I shall first describe the use of 4-chlorophenyl phenyl sulfone or 4-bromophenyl phenyl sulfone and shall then describe the even superior results which may be obtained by the use of these substances in admixture with the other materials mentioned.

4-chlorophenyl phenyl sulfone and 4-bromophenyl phenyl sulfone are effective in killing mites, particularly plant feeding mites belonging to the families Tetranychadae and Eriophyidae in all stages of their development, e. g. eggs, and all mature and immature post-embryonic forms.

The compounds have various advantages. For example, in comparison with O,O,diethyl-O,p-nitrophenyl thiophosphate (Parathion), 4-chlorophenyl phenyl sulfone is more effective in controlling various species of mites at the same concentration. In addition, 4-chlorophenyl phenyl sulfone is less phytotoxic than Parathion and therefore can be used on a wider range of plants and at higher concentrations to control mites than is possible with Parathion. Reference has been made to Parathion for comparison because it is presently regarded as a very effective miticide and is being used extensively on a commercial scale. The 4-chlorophenyl phenyl sulfone and 4-bromophenyl phenyl sulfone are further unique in that they are effective against mites while closely related compounds are not, such as the para-dichlorodiphenyl sulfone, ortho-monochlorodiphenyl sulfone, meta-monochlorodiphenyl sulfone, p-monofluorodiphenyl sulfone and p-monoiodoiphenyl sulfone.

The 4-chlorophenyl phenyl sulfone and 4-bromophenyl phenyl sulfone can be applied in any desired manner, as an aqueous spray, as an aerosol, or as a dust. When applied in an aqueous spray, the 4-chlorophenyl phenyl sulfone or 4-bromophenyl phenyl sulfone should be present in a concentration of from 0.01% to 1.0%; usually about 0.125% to 0.25% by weight. When applied as a dust, the 4-chlorophenyl phenyl sulfone or the 4-bromophenyl phenyl sulfone should be present in concentration of 1% to 50% by weight in a suitable inert carrier, usually about 5%. The 4-chlorophenyl phenyl sulfone and 4-bromophenyl phenyl sulfone are not difficult to compound and one can employ these separately or as a mixture in any of the carrier compositions utilized with acaricides heretofore; they are solids at ordinary temperatures.

The following are illustrations of the effectiveness of the 4-chlorophenyl phenyl sulfone.

Potted cotton plants heavily infested with all stages of the two-spotted mite, Tetranychus bimaculatus (Harvey) were sprayed in groups of two with various aqueous spray compositions containing 4-chlorophenyl phenyl sulfone; the compositions were identical except that the concentrations of 0.5%, 0.25%, 0.125%, 0.06% and 0.03% were employed. On all of the plants sprayed with these compositions, there was a 100% kill of eggs and all post-embryonic forms. All plants remained free of mites for twenty-one days thereafter, at which time the experiment was terminated.

The mite infestation on the unsprayed control plants increased rapidly and, at the termination of the experiment, their leaves had been destroyed by the excessive injury caused by the mites.

To show the comparative effectiveness of 4-chlorophenyl phenyl sulfone as against Parathion, under similar conditions potted cotton plants, infested with the two-spotted mite, were sprayed with a conventionally formulated Parathion aqueous spray containing 0.03% of Parathion. This test was conducted in every detail in an identical manner to the tests with 4-chlorophenyl phenyl sulfone. This Parathion spray caused a 100% mortality of all post-embryonic forms, but only 90% of the eggs. The mite population on these plants had increased appreciably by the time the experiment was terminated because of the incomplete ovicidal action of the Parathion.

To establish further the effectiveness of 4-chlorophenyl phenyl sulfone, field tests were conducted on the following species of mites on the following hosts; in these tests an aqueous spray containing 0.125% of 4-chlorophenyl phenyl sulfone was employed:

European red mite, Paratetranychus pilosus, on prune and apple; the clover mite, Bryobia praetiosa, on prune, peach, apple and almond; the pear leaf blister mite, Eriophyes pyri, on prune. In all cases, excellent control of these pests was obtained, the eggs and all active forms being killed.

Material containing 4-chlorophenyl phenyl sulfone and having useful properties can be prepared by placing a batch of 4-chlorobenzene sulfonic acid in a vessel and maintaining this under agitation at a temperature of from 230°–250° C. A current of benzene vapor is passed through until water is no longer evolved from the vessel. The product in the vessel is then cooled to about 60°–80° C., poured into cool, distilled water to wash out unreacted sulfonic acid, filtered and dried and then distilled at atmospheric pressure. The bulk of the product (approximately 80%) distills over at 382°–386° C. The cooled distillate melts around 82° C. This reaction product was useful in killing mites, as illustrated by the following test:

Potted cotton plants and potted pinto bean plants heavily infested with Tetranychus bimaculatus (Harvey) were sprayed with aqueous suspensions of 4-chlorophenyl phenyl sulfone at concentrations of 0.5%, 0.25% and 0.125% of compound by weight. The several compositions were made up from a 10% wettable powder. Observations made twelve days after spraying plants showed a complete mortality of all ova and all active forms on cotton plants at all concentrations. Complete mortality of all ova and all active forms occurred on all bean plants at concentrations of 0.5% and 0.25%, with several very weak adult survivors observed on plants sprayed at 0.125% concentrations. No potentially viable ova were observed on the pinto bean plants sprayed with 0.125% concentrations. Controls remained heavily infested and suffered severe injury due to the mites during the control period.

Instead of passing the benzene vapor through the 4-chlorobenzene sulfonic acid in the above example, one can use the reverse procedure, that is, passing 4-chlorobenzol vapor through benzene sulfonic acid, the conditions otherwise being the same.

In the above procedures, the reaction temperature of 230–250° C. results in the evolution of sulfur dioxide. When the temperature is lowered to about 160° C. and the reaction is carried on in accordance with the directions given by Meyer, Annalen, vol. 433, pp. 327 et. seq. (1927), useful materials are also obtained upon reaction of 4-chlorobenzene sulfonic acid and benzene, or the reverse procedure, that is by reacting benzene sulfonic acid and 4-chlorobenzol. All of these materials are useful, as I have indicated.

As illustrative of compositions which can be effective acaricides, the following compositions are set forth:

50 pounds of 4-chlorophenyl phenyl sulfone were dispersed on 49.5 pounds of Attaclay, a finely divided clay, together with a half pound of Duponol 51, a higher aliphatic alcohol sulfate wetting agent. The final composition provided a dry powder which, when placed with water, wetted readily; the composition was sprayed on mite loci. Such compositions are usually applied at the rate of about two pounds per 100 gallons of water, although this can be varied between about one-half pound and four pounds per 100 gallons. In place of Attaclay, one can use any other suitable inert finely divided carrier such as pyrophyllite, diatomaceous earth, bentonite, volcanic ash, talc, lignocellulosic flour, sulfur, and mixtures of these. The concentration of 4-chlorophenyl phenyl sulfone in the finished product can vary; generally it is desirable to utilize as much of the effective compound as is feasible and economical and the concentration of the 4-chlorophenyl phenyl sulfone can be increased to the order of 90% and up to 98%.

The 4-chlorophenyl phenyl sulfone can also be applied as a dust, being mixed with any of the forementioned carriers, the wetting agent being omitted. In this instance, the concentration of the 4-chlorophenyl phenyl sulfone can vary over fairly wide limits, as between 1% and 50%.

The 4-chlorophenyl phenyl sulfone can also be applied as a liquid dispersed in water and one can make up a liquid concentrate by dissolving the 4-chlorophenyl phenyl sulfone in a suitable solvent and adding a wetting agent. Generally it is desirable that the concentration of the 4-chlorophenyl phenyl sulfone be as high as its solubility in a given solvent will permit. A typical composition includes 25% by weight of the 4-chlorophenyl phenyl sulfone, 10% of Triton X-100, a wetting agent made by Rohm & Haas, 10% of acetone and the balance xylene or an equivalent solvent such as a petroleum fraction known as Socal 3. The 4-chlorophenyl phenyl sulfone is soluble to a limited extent in the less expensive solvents and it is therefore desirable to add a small amount of a mutual solubilizing agent such as acetone.

The ortho- and meta-isomers of the aforementioned 4-chlorophenyl phenyl sulfone and bis (4-chlorophenyl) sulfone were completely ineffective when tested under the same conditions with the 4-chlorophenyl phenyl sulfone and which killed all ova and active mite forms.

When 4-bromophenyl phenyl sulfone was substituted for 4-chlorophenyl phenyl sulfone in the above tests, it exhibited a miticidal effectiveness of the same order, but slightly less, than that of the 4-chlorosulfone. Both compounds have valuable fungicidal properties and their application to plants is therefore also of value in this respect as well as against mites. The 4-bromophenyl phenyl sulfone can be made by any of the foregoing procedures but utilizing the bromine compound instead of the corresponding chlorine compound, that is, by utilizing 4-bromobenzene sulfonic acid instead of 4-chlorobenzene sulfonic acid in one case, and 4-bromobenzene instead of 4-chlorobenzene in the other case.

The pesticidal properties of 4-chlorophenyl phenyl sulfone or 4-bromophenyl phenyl sulfone are enhanced if they are applied in admixture with diphenyl sulfone, with bis (4-chlorophenyl) sulfone or mixtures of these compounds.

This enhanced activity is surprising from two standpoints. In the first place, diphenyl sulfone has only limited miticidal properties and bis(4-chlorophenyl) sulfone has no miticidal activity of its own, so that one would not expect these compounds to exercise any substantial miticidal activity when used together with another compound. In the second place, the degree of enhancement is very great, and if one replaces a portion of the 4-chlorophenyl phenyl sulfone with the less effective diphenyl sulfone, or bis(4-chlorophenyl) sulfone, or mixtures of these, the resulting composition is even more effective than the pure mono halogenated sulfone.

The insecticidal activity of various mixtures of these compounds is also surprising, since the three sulfone compounds have only an insignficant insecticidal effect when used alone, yet, when combined as will be explained, they comprise an effective insecticide.

The above described phenomenon is a manifestation of synergism, activation, or both, as will now be explained:

Synergism between toxicants has been defined by Wadley (see U. S. Bureau of Entomology and Plant Quarantine ET Series, Numbers 223 and 275) as a joint action of two materials such that the total effect is greater than the sum of the two effects when each material is used alone; this definition may be expanded to include three or more toxicants which act jointly to produce a toxic effect greater than the sum of their additive effects.

The foregoing definition of synergism is limited to toxicants that produce some effect when used alone. A mixture containing one toxic and one non-toxic compound but which exhibits a similar phenomenon is referred to as an activating mixture, the phenomenon being referred to as activation.

The existence of synergism or activation can be determined experimentally by comparing the effect of a mixture of compounds with the effect expected from the sum of the separate toxic effects of the compounds when each is used alone. For example, if compound A has a toxicity of 1 unit and compound B has a toxicity of 2 units, a 1:1 mixture of these compounds would be expected to have a toxicity of 1½ units. If, however, the toxicity of the mixture is appreciably greater than 1½ units, synergism has been demonstrated. As another example, if compound A has a toxicity of 1 unit and compound C has a toxicity of 0, a 1:1 mixture of these compounds would be expected to have a toxicity of ½ unit. If, however, the mixture has a toxicity appreciably greater than ½ unit, activation has been demonstrated.

The phenomenon of synergism or activation is not limited to a two component mixture and one may encounter the following typical example: If compound A has a toxicity of 1 unit and compound B has a toxicity of 2 units and compound C has a toxicity of 0, a 1:1:1 mixture of these compounds would be expected to have a toxicity of 1 unit. If, however, this mixture has a toxicity greater than 1 unit, synergism, activation, or both, have been demonstrated.

Where synergism or activation are obvious and very pronounced, it is customary to express toxicity as the percentage kill of the organism afforded by the toxicant at a given dosage in demonstrating the existence of the phenomena. In such cases, an examination of the percentage mortality data of the individual components and of the mixtures of the components will provide satisfactory proof of the presence of synergism, activation or, possibly both of these. For the determination of synergism or activation, where these phenomena are real but not obvious, it is customary to express toxicity on terms of the dosage required to kill 50% of the organisms; this expression of toxicity is commonly referred to as the lethal dosage—50%, LD–50.

Wadley (see U. S. Bureau of Entomology and Plant Quarantine ET Series, Numbers 223 and 275) has outlined an accepted procedure for the determination of synergism in a two component mixture which consists of comparing the actual LD–50 value of a mixture of the two components with the LD–50 value expected from the additive effects of the components in the mixture. This procedure can be expanded for use in three or more component synergistic or activated mixtures.

The following examples prove that mixtures consisting of all three or any two of the components under consideration provide synergistic or activated mixtures.

*Example 1.*—Showing the action of 4-chlorophenyl phenyl sulfone, bis (4-chlorophenyl) sulfone and diphenyl sulfone on the two-spotted mite, *Tetranychus bimaculatus* Harvey:

Sprays were prepared by dissolving the component or mixture of components in acetone at a concentration of 2.5 grams per 100 milliliters. The solution was added to water in the amount necessary to furnish the desired concentration in the final spray. The following adjuvants, at the concentrations shown, were used in the spray to facilitate dispersability and wetting: methyl cellulose at 0.005% and Vatsol OT (A higher alcohol ester of sodium sulfosuccinic acid) at 0.015%.

Seedling pinto bean plants free of mites were sprayed thoroughly with aqueous sprays containing the following concentrations of each component or mixture: 0.10%, 0.08%, 0.06%, 0.04% and 0.02%. After the plants had dried thoroughly, each was infested uniformly with all postembryonic stages of the two-spotted mite. The plants were then set aside in the greenhouse for seven days, after which time they were carefully examined and the numbers of dead and live eggs and postembryonic forms recorded.

Dosage mortality curves were calculated for 4-chlorophenyl phenyl sulfone and for diphenyl sulfone using the method outlined by Bliss (Annals of Applied Biology, volume 26, pp. 813–821). Since bis(4-chlorophenyl) sulfone was not toxic it was impossible to calculate a dosage mortality curve and therefore, an LD–50 value of infinity was assigned to the compound in accordance with accepted statistical procedure.

Dosage mortality data for each mixture of compounds was evaluated by the method outlined by Wadley (U. S. Bureau of Entomology and Plant Quarantine ET Series Numbers 223 and 275).

From the procedure outlined in the above mentioned publication ET 223 it was found that diphenyl sulfone showed an equivalence of 0.2151 with respect to 4-chlorophenyl phenyl sulfone. In other words diphenyl sulfone was found to be 0.2151 times as toxic as 4-chlorophenyl phenyl sulfone. This equivalence was obtained by dividing the LD–50 of 4-chlorophenyl phenyl sulfone (.0416) by the LD–50 of diphenyl sulfone (0.1934).

Each concentration of the mixture was then transformed into terms of 4-chlorophenyl phenyl sulfone as outlined by Wadley (see Table 1, ET 223). These are termed the 4-chlorophenyl phenyl sulfone equivalents.

The 4-chlorophenyl phenyl sulfone equivalent is simply the dosage of 4-chlorophenyl phenyl sulfone that would produce the same percentage mortality as the corresponding dosage of the mixture if the effects of the two components were only additive. Therefore, the mortality produced by the equivalent dosage represents that which would be expected if no synergism occurs. If synergism does occur the mortality will be higher than expected for each dosage.

In Table I, actual LD–50 values for 4-chlorophenyl phenyl sulfone (A) diphenyl sulfone (B) and bis(4-chlorophenyl) sulfone (C) are given.

In calculating actual LD–50 values for the mixture containing 1 part of A and 1 part of B the dosages were transformed to equivalents in terms of 4-chlorophenyl phenyl sulfone. The actual LD–50 value of .0252 is considerably lower than the expected value of .0416. In this case the actual toxicity is 65 percent higher than would be expected if the components of the mixture produced only additive effects. The mixture therefore, is unquestionably synergistic.

In the mixture containing 1 part of A and 1 part of C the same procedure was followed. The only difference lies in the fact that C contributes nothing to the toxicity and contributes nothing toward the equivalent dosage.

Since the LD–50 for the actual toxicity of the mixture is .0194 and the expected toxicity is .0416, it is obvious that the actual toxicity of the mixture is 114 percent greater than would be expected from additive effects.

The mixture containing 1 part A, 1 part B and 1 part C has been treated in exactly the same manner. From an examination of the actual and expected LD–50 values it is obvious that the mixture is 151% more toxic than can be accounted for by simple additive effects. This three component mixture is therefore, unquestionably synergistic.

*Table I*

| | LD-50 Values (Percent Concentration) | | Ratio of Expected to Actual Toxicity |
|---|---|---|---|
| | Expected | Actual | |
| Material: | | | |
| A—4-chlorophenyl phenyl sulfone | | .0416 | |
| B—diphenyl sulfone | | .1934 | |
| C—bis(4-chlorophenyl) sulfone | | Infinite | |
| Mixtures: | | | |
| 1 part A+1 part B | .0416 | .0252 | 1:1.65 |
| 1 part A+1 part C | .0416 | .0194 | 1:2.14 |
| 1 part B+1 part C | .1934 | .0586 | 1:3300 |
| 1 part A+1 part B+1 part C | .0416 | .0166 | 1:2.51 |

Since the toxicity is greater than that expected in each case, the existence of synergism is demonstrated in the mixture of A and B. Since bis(4-chlorophenyl) sulfone alone was ineffective under the conditions of this test, the increased activity in the case of mixtures A—C and B—C, is considered activation. Mixtures A—B—C may include both synergism and activation, but the extent of each is left undetermined for the overall result is alone considered important at this time.

*Example 2.*—Showing the interaction of 4-chlorophenyl phenyl sulfone, bis(4-chlorophenyl) sulfone and diphenyl sulfone on the bean aphid, *Aphis fabae* Scop:

Broad bean plants heavily infested with bean aphid were sprayed thoroughly with a spray containing 0.5% of each component or each mixture. The spray was prepared as described in Example 1 except that only a concentration of 0.5% was employed. After spraying, the plants were placed in the greenhouse for 24 hours when a careful examination of the plants was made and the number of live and dead aphids recorded.

The percentage mortality afforded by a component or component mixture at the concentration of 0.5% is considered to furnish a satisfactory evaluation of synergism in the mixture of these compounds, in view of the very pronounced increase in activity of the mixtures over that afforded by separate components.

The essential data are presented in Table II.

Table II

|  | Percent Concentration | Percent Mortality |
|---|---|---|
| Material: |  |  |
| A—4-chlorophenyl phenyl sulfone | 0.5 | 15.8 |
| B—diphenyl sulfone | 0.5 | 5.6 |
| C—bis(4-chlorophenyl)sulfone | 0.5 | 2.6 |
| Mixtures: |  |  |
| 1 part A + 1 part B | 0.5 | 25.0 |
| 1 part A + 1 part C | 0.5 | 63.2 |
| 1 part B + 1 part C | 0.5 | 31.5 |
| 1 part A + 1 part B + 1 part C | 0.5 | 45.2 |
| Mixture containing 74% A, 14% B, 12% C | 0.5 | 82.1 |

In the above, the last mixture, that containing 74% A, 14% B and 12% C, is referred to as "technical 4-chlorophenyl phenyl sulfone."

It will be noted that the mortality was greater in every case when a mixture was employed.

The mixed sulfones, in any proportions, are solids at ordinary temperatures. 4-chlorophenyl phenyl sulfone, diphenyl sulfone and bis(4-chlorophenyl) sulfone are miscible in all proportions when melted with each other to provide any two or three component mixtures. As is shown in the included data, the mixtures have been tested over a wide range of ratios and each of the mixtures exhibits superior utility as compared to any single component. The ratio of various components to one another is not critical and all mixtures of diphenyl sulfone, bis(4-chlorophenyl) sulfone and 4-chlorophenyl phenyl sulfone, which provides two or three component mixtures, exhibit a synergistic or activation effect with respect to a single component.

To demonstrate the wide range of concentrations of the various ingredients which may be used, the following are set forth:

*Example 3.*—Acetone solutions of bis(4-chlorophenyl) sulfone and 4-chlorophenyl phenyl sulfone at varying ratios were added to water, together with a suitable wetting and spreading agent, and sprayed onto pinto bean plants heavily infested with two-spotted mite eggs (*Tetranychus bimaculatus* Harvey). The concentration of 4-chlorophenyl phenyl sulfone was held constant at 0.03% and the amount of bis(4-chlorophenyl) sulfone was varied from 4.8% to 16.7% of the weight of the 4-chlorophenyl phenyl sulfone. The percentage of mortality increase (see Table III) resulting from the addition of the bis(4-chlorophenyl) sulfone represents the effect of its activation on 4-chlorophenyl phenyl sulfone; activation alone is considered involved since, under the conditions of this test, bis(4-chlorophenyl) sulfone was ineffective.

Table III

| Concentration of Each Component in the Spray, Percent by Weight | | Percentage of Each Component in the Mixture | | Ratio of B:A | Percent Mortality |
|---|---|---|---|---|---|
| A | B | A | B | | |
| 4-chlorophenyl phenyl sulfone | Bis (4-chlorophenyl) sulfone | A | B | | |
| .03 | 0 | 100 | 0 | -------- | 52.0 |
| .03 | .0015 | 95.2 | 4.8 | 5:100 | 60.6 |
| .03 | .0030 | 91.0 | 9.0 | 10:100 | 70.6 |
| .03 | .0045 | 87.0 | 13.0 | 15:100 | 96.7 |
| .03 | .0060 | 83.3 | 16.7 | 20:100 | 92.1 |
| 0 | .03 | 0 | -------- | -------- | 0.0 |

Thus, the addition of activator B to toxicant A, increases the toxicity of the toxicant from 52% mortality to 92.1% mortality.

*Example 4.*—To explore the range of ratios over which 4-chlorophenyl phenyl sulfone and diphenyl sulfone exhibit synergistic activity, wettable powders containing various ratios of these two compounds were prepared according to the following procedure:

Weighed quantities of diphenyl sulfone and 4-chlorophenyl phenyl sulfone were fused together and the mixture allowed to cool. The mixture was then diluted by adding 80% by weight of Attaclay and the resulting mixture was ground in an air mill, of the type disclosed in the Kidwell Patent 2,219,011. To the ground mixture was then added ½% of Duponol 51, a sulfated higher aliphatic alcohol wetting agent, to produce an easily wettable powder.

Varying concentrations of these preparations in water were then sprayed onto uninfested pinto bean plants. After the residue had dried thoroughly, the plants were infested uniformly with all postembryonic stages of the two-spotted mite, *Tetranychus bimaculatus* Harvey. The plants were then set aside for seven days in the greenhouse, after which time they were examined for dead and live mites.

The percentage mortality data were treated in an identical manner to that described in Example I. The essential data, showing synergistic activity in these mixtures, are presented in Table IV.

Table IV

| Percentage of each Component in Mixture | | Percent Concentration | | Ratio of Expected to Actual Toxicity |
|---|---|---|---|---|
| 4-chlorophenyl phenyl sulfone | Diphenyl sulfone | Expected | Actual | |
| 25 | 75 | .0304 | .0242 | 1:1.26 |
| 40 | 60 | .0304 | .0234 | 1:1.30 |
| 60 | 40 | .0304 | .0204 | 1:1.49 |
| 75 | 25 | .0304 | .0118 | 1:2.58 |
| 90 | 10 | .0304 | .0257 | 1:1.18 |
| 94 | 6 | .0304 | .0266 | 1:1.14 |
| 98 | 2 | .0304 | .0251 | 1:1.21 |

From these data, it is obvious that even the relatively small quantity of 2% diphenyl sulfone exerts a pronounced effect on the toxicity of 4-chlorophenyl phenyl sulfone. This effect is greatly increased at higher concentrations of the diphenyl sulfone.

It is preferred to operate within the range of from 2% to 98% of either diphenyl sulfone or bis(4-chlorophenyl) sulfone or mixtures thereof with from 98% to 2% of 4-chlorophenyl phenyl sulfone and from about 2%–98% of diphenyl sulfone with about 98%–2% of bis(4-chlorophenyl) sulfone. If a three component mixture is used, it is preferred that none of the components be present in a concentration of less than 2%. A particularly good two component mixture consists of about 25% diphenyl sulfone and about 75% 4-chlorophenyl phenyl sulfone. A particularly good three component mixture is the aforementioned "technical 4-chlorophenyl phenyl sulfone" which consists of 74% 4-chlorophenyl phenyl sulfone, 14% diphenyl sulfone and 12% bis(4-chlorophenyl) sulfone. The invention is not limited to these particular ratios, since any ratio may be used to advantage as compared to one of the components.

The above demonstrations of synergism have been confirmed by field applications.

*Example 5.*—Two plots of physically adjacent apple trees heavily infested with the European red mite, *Paratetranychus pilosus*, C and F, were sprayed with two different suspensions made with a 50% wettable powder, each suspension containing 0.12% of one of the toxicants. In one case, the toxicant was 4-chlorophenyl phenyl sulfone, while in the other, the toxicant consisted of a mixture containing 5.4 parts by weight 4-chlorophenyl phenyl sulfone and one part of diphenyl sulfone. With 4-chlorophenyl phenyl sulfone, the control lasted twenty days, that is, the trees were mite-free for this period while with the mixture containing the two components, the trees were mite-free for sixty-six days. The trees in each plot were closely adjacent and were subject to the same climatic conditions, wind and the like.

*Example 6.*—A spray containing 0.12% of each of the following components was sprayed onto prune trees that were heavily infested with eggs and first instar forms of the clover mite, *Bryobia praetiosa* Koch. After seven days an examination of the twigs was made and the numbers of live mites were recorded.

Pretreatment counts showed that an average of approximately fifteen live mite individuals were present on each twig. At the end of seven days the numbers of individual live mites per twig was determined by careful examination. These values and the percentage control are presented in Table V.

*Table V*

| Material (0.12% Conc.) | No. of Mites per Twig 7 days after Spraying | Percent Control |
|---|---|---|
| 4-chlorophenyl phenyl sulfone | 1.5 | 90.0 |
| 1:1 Mixture, 4-chlorophenyl phenyl sulfone and diphenyl sulfone | 0.4 | 97.3 |
| Mixture of 74% 4-chlorophenyl phenyl sulfone, 14% diphenyl sulfone, 12% bis(4-chlorophenyl) sulfone | 0.4 | 97.3 |

The above mentioned co-pending patent application Serial No. 105,273, July 16, 1949, and of which this is a continuation-in-part, and in the present application I have disclosed a process of making 4-chlorophenyl phenyl sulfone by the reaction of benzene sulfonic acid and monochlorobenzene, or by the reaction of p-chlorobenzene sulfonic acid and benzene. By selection of reaction conditions, one can obtain from this process a mixture containing about 70% 4-chlorophenyl phenyl sulfone, 13% diphenyl sulfone, 11% bis(4-chlorophenyl) sulfone, 3% 3-chlorophenyl phenyl sulfone, and 3% 2-chlorophenyl phenyl sulfone. Based on the first three components, which form the effective portion of the mixture, the effective ingredients are present in approximately the following proportions: 74% 4-chlorophenyl phenyl sulfone, 14% diphenyl sulfone, and 12% bis(4-chlorophenyl) sulfone; this is technical 4-chlorophenyl phenyl sulfone. This material is more effective against mites than 4-chlorophenyl phenyl sulfone, as is shown in the following:

*Example 7.*—At Winchester, Virginia, 50% wettable powder formulations of 4-chlorophenyl phenyl sulfone and "technical 4-chlorophenyl phenyl sulfone" were compared in an apple orchard heavily infested with a mixed population of the European red mite and an undetermined species of mite belonging to the genus *Tetranychus*.

These two materials were applied thoroughly in sprays containing respectively one pound per 100 gallons of each toxicant. The population density of mites on the trees was determined at intervals following application. The degree of control is expressed as the percentage reduction in mite density in the treated plots in comparison with the mite density in a control plot.

The percentage control afforded by each material is presented in Table VI.

*Table VI*

| Material in Spray (1 lb. per 100 gals.) | Percentage Reduction in Mite Density following Treatment after— | | | |
|---|---|---|---|---|
| | 3 days | 1 week | 2 weeks | 3 weeks |
| 4-chlorophenyl phenyl sulfone | 0.0 | 73.7 | 84.7 | 78.6 |
| "Technical 4-chlorophenyl phenyl sulfone" | 67.7 | 86.6 | 96.3 | 90.1 |

*Example 8.*—In a similar experiment at the same locality (see Example 7) on apple trees heavily infested with both the European red mite and an unidentified species of mite belonging to the genus Tetranychus, comparable results were obtained. Data obtained in this experiment are presented in Table VII.

*Table VII*

| Material in Spray (1 lb. per 100 gals.) | Percentage Reduction in Mite Density following Treatment after— | | |
|---|---|---|---|
| | 3 days | 1 week | 2 weeks |
| 4-chlorophenyl phenyl sulfone | 41.4 | 46.3 | 78.8 |
| "Technical 4-chlorophenyl phenyl sulfone" | 80.3 | 83.2 | 86.3 |

The following show that the mixture defined above as "technical 4-chlorophenyl phenyl sulfone" is an effective insecticide. In each instance the treated crop consisted of Valencia orange trees and the insect pest was the black scale, *Sassetia olea* Bern. In these, the average number of scale was observed on 20 leaves or 10 twigs before and after spraying. The "technical 4-chlorophenyl phenyl sulfone" was used in the form of a 50% wettable powder (see Example 4 for the manner of making this wettable powder), and is identified in each case as R-242, 50% W. P.; the powder contained 50% by weight of R-242, the material of Example 8, and prepared as is taught in my aforementioned co-pending application Serial No. 105,273.

*Example 9.*—The effect of R-242, 50% W. P., was compared with that of the well-known insecticide, Parathion, in a usual composition for application of this material; Parathion is O,O,diethyl O-p-nitrophenyl thiophosphate. Counts were made of the scale population before the test and three months thereafter. The trees were sprayed with conventional high pressure equipment at the rate of 21 gallons per tree. The results obtained are presented in Table VIII.

*Table VIII*

| Material | Amount per 100 gallons | Average number of Black Scale per Tree before application | | Average number of Black Scale per Tree Three Months after Application |
|---|---|---|---|---|
| | | 20 leaves | 10 twigs | 10 twigs |
| R-242, 50% W. P. | 4 lbs | 96.4 | 64.9 | 0 |
| Kerosene | 1 gal | 207.7 | 83.3 | 0.3 |
| Parathion | 1 lb | | | |

*Example 10.*—R-242 may be combined with Parathion and the following Table IX compares the results obtained when R-242 is used alone or in combination. The trees were sprayed with 25 to 30 gallons of the indicated spray formulation per tree and scale counts were made about ten weeks later.

Table IX

| Material | Amount per 100 gallons | Average Number of Black Scale 2 days Prior to Spraying | Average Number of Black Scale on 20 Leaves per Tree 10 weeks after Spraying |
| --- | --- | --- | --- |
| Light medium oil emulsified | 1¾ gal | 21.3 | 0.6 |
| Parathion, 25% WP | 1 lb | 17.3 | 7.8 |
| Parathion, 25% WP [1] | 1½ lbs | 14.3 | 5.4 |
| Parathion, 25% WP | 2 lbs | 22.3 | 0.8 |
| Parathion, 25% WP<br>R-242, 50% WP | 1 lb<br>2 lbs | 39.0 | 1.6 |
| Parathion, 25% WP<br>R-242, 50% WP | 1½ lbs<br>2 lbs | 15.4 | 1.0 |
| Parathion, 25% WP<br>R-242, 50% WP | 2 lbs<br>2 lbs | 18.7 | 1.0 |
| Kerosene<br>Parathion 25% WP<br>BAS [2] | 2 gals<br>½ lb<br>4 oz | 25.3 | 43.4 |
| Kerosene<br>Parathion, 25% WP<br>BAS | 2 gals<br>¾ lb<br>4 oz | 20.7 | 31.2 |
| Kerosene<br>Parathion, 25% WP<br>BAS | 2 gals<br>1 lb<br>4 oz | 16.6 | 11.0 |
| Kerosene<br>Parathion, 25% WP<br>R-242, 50% WP<br>BAS | 2 gals<br>1 lb<br>2 lbs<br>4 oz | 30.0 | 2.2 |
| Kerosene<br>Parathion, 25% WP<br>R-242, 50% WP<br>BAS | 2 gals<br>¾ lb<br>2 lbs<br>4 oz | 40.3 | 2.6 |
| Kerosene<br>Parathion, 25% WP<br>R-242, 50% WP<br>BAS | 2 gals<br>1 lb<br>2 lbs<br>4 oz | 10.0 | 0 |

[1] Wettable powder.
[2] Blood albumen spreader.

The compositions of the present invention can be applied in any desired manner such as an aqueous spray, as an aerosol, as a dust, an oil solution, or an ointment. When applied as an aqueous spray, the sulfone component of the spray should be present in a total concentration of from 0.01% to 1.0%, usually about 0.125% to 0.25% by weight. When applied as a dust, the sulfone content should be present in a concentration of from 1% to 50% by weight in a suitable inert carrier, usually about 5%. The mixtures are not difficult to compound and one can employ the mixtures in any of the carrier compositions utilized heretofore with known acaricides or insecticides.

*Example 11.*—As illustrative of compositions which can be effective against mites and insects, the following are set forth:

About 35 pounds of 4-chlorophenyl phenyl sulfone was melted with 15 pounds of diphenyl sulfone and the melt was allowed to cool and solidify, whereupon it was ground in an air mill of the Kidwell patent type. The ground mixture was dispersed by dry mixing on 49.5 pounds of Attaclay, a finely divided clay, together with one-half pound of Duponol 51, a sulfated higher aliphatic alcohol wetting agent. The final composition provided a dry powder which, when added to water, wetted readily; the composition formed with suitable for spraying on acaricide and insect habitats. Such compositions are usually applied at the rate of two pounds per 100 gallons of water although this can be varied from between about one-half pound and four to twenty-five pounds per 100 gallons of water. In place of Attaclay, one can use any other suitable inert finely divided carrier such as diatomaceous earth, bentonite, volcanic ash, talc, lignocellulosic flour, sulfur, and mixtures of these. The concentration of the components in the finished product can vary; generally it is desirable to utilize as much of the effective component as is feasible and economical and the concentration of the components can be increased to the order of 90% and even up to 98%.

*Example 12.*—The effect of R-242 50% W. P. (made in accordance with Example 4) on the hog louse, *Haematopinus suis* (Linn.).

A group of swine that were heavily infested with lice were sprayed thoroughly with an aqueous suspension of the above mentioned material at a concentration of three pounds per 100 gallons. After three days the animals were examined thoroughly, and no live lice could be found. At the end of ten days the swine were examined again and were still free from lice. Unsprayed swine from the same herd remained heavily infested during the course of this experiment.

*Example 13.*—The effect of R-242 10% dust on the Pacific Coast tick, *Dermacentor occidentalis* Neum.

A group of dogs that were heavily infested with ticks were dusted thoroughly with dust containing 10% R-242 and the balance an inert carrier. The dogs were examined at the end of 24 hours and no live ticks could be found. The dogs were then permitted to inhabit a tick-infested area for ten days, after which time they were again examined. Untreated, uninfested dogs were permitted to inhabit the same area for the same period of time.

The untreated dogs became infested with ticks at an average rate of about 5 per day, while the dogs receiving the treatment of R-242 10% dust were uninfested at the end of the ten day exposure period.

*Example 14.*—The effect of R-242 10% dust on the dog flea, *Ctenocephalides canis* (Curt.).

A group of dogs that were heavily infested with dog fleas were dusted thoroughly with the dust of Example 13. They were permitted to inhabit an area that was heavily infested with fleas. A thorough examination of the dogs was made at the end of two days and no live fleas could be found. At the end of ten days the dogs were also free from fleas.

*Example 15.*—The effect of R-242 on canine mange mites, *Sarcoptes scabiei*, var. *canis* Gerlach.

A group of dogs that were heavily infested about the ears, eyes and rectum with mange were treated with a 0.2% solution of R-242 in cottonseed oil. One week after application, the dogs had improved to the point of almost complete cure.

The mixed sulfone components can also be applied, after being mixed with any of the aforementioned carriers, as a dust, the wetting agent being omitted if desired. In the case of dusts, the concentration of the mixed sulfone components can vary over fairly wide limits, as between 1% and 50% and even more. The mixed sulfone components can also be applied as a liquid dispersed in water and one can make up a liquid concentrate by dissolving the mixed sulfone components in a suitable solvent and adding a wetting agent; the sulfone components are soluble in hydrocarbon solvents usually employed in such compositions as are applied to plants and animals. Generally it is desirable that the concentration of the mixed sulfones be as high as the solubility of the mixture in a given solvent will permit. A typical composition includes 25% by weight of the mixed sulfone, 10% of Triton X-100, an alkylated aryl poly-ether alcohol wetting agent made by Rohm & Haas, 10% of acetone and the balance xylene or an equivalent solvent such as a petroleum fraction known to the trade as "Socal 3." In many cases it is advisable to add a small amount of a mutual solubilizing agent such as acetone to enable the less expensive solvents such as petroleum fractions to be used.

Any of the two or three component mixtures described can be formulated in the manner of the two preceding paragraphs.

The mixed sulfones have valuable fungicidal properties and their application to plants and animals is therefore also of value in this respect, as well as against mites and insects.

In place of 4-chlorophenyl phenyl sulfone one can use 4-bromophenyl phenyl sulfone with practically equal utility although this latter compound is more expensive to manufacture.

I claim:

1. The method of killing arthropod pests comprising applying to a pest habitat a mixture containing a compound selected from group 1 and a compound selected from group 2 wherein group 1 consists of 4-chlorophenyl phenyl sulfone, 4-bromophenyl phenyl sulfone and mixtures thereof, and group 2 consists of diphenyl sulfone, bis(4-chlorophenyl) sulfone and mixtures thereof.

2. The method of killing arthropod pests comprising applying to a pest habitat diphenyl sulfone and a material selected from the group consisting of 4-chlorophenyl phenyl sulfone and 4-bromophenyl phenyl sulfone.

3. The method of killing arthropod pests comprising applying to a pest habitat a mixture containing bis(4-chlorophenyl) sulfone and a material selected from the group consisting of 4-chlorophenyl phenyl sulfone and 4-bromophenyl phenyl sulfone.

4. The method of killing arthropod pests comprising applying to a pest habitat a mixture consisting of diphenyl sulfone, bis(4-chlorophenyl) sulfone and a material selected from the group consisting of 4-chlorophenyl phenyl sulfone and 4-bromophenyl phenyl sulfone.

5. A composition effective against arthropod pests containing an inert insecticidal adjuvant as a carrier and a mixture containing a compound selected from group 1 and a compound selected from group 2 wherein group 1 consists of 4-chlorophenyl phenyl sulfone, 4-bromophenyl phenyl sulfone and mixtures thereof, and group 2 consists of diphenyl sulfone, bis(4-chlorophenyl) sulfone and mixtures thereof.

6. The composition of claim 5 in which the mixture is in the form of a powder containing a finely divided inert solid carrier.

7. The composition of claim 5 in which the carrier consists of water and the materials are dispersed therein.

8. The composition of claim 5 wherein each member is present in the quantity of at least 2% by weight of the mixture.

9. A composition of matter effective against arthropod pests containing an inert insecticidal adjuvant as a carrier and as an effective ingredient a mixture of diphenyl sulfone and a material selected from the group consisting of 4-chlorophenyl phenyl sulfone and 4-bromophenyl phenyl sulfone.

10. A composition of matter effective against arthropod pests containing as an effective ingredient a mixture of bis(4-chlorophenyl) sulfone and a material selected from the group consisting of 4-chlorophenyl phenyl sulfone and 4-bromophenyl phenyl sulfone.

11. A composition of matter effective against arthropod pests containing an inert insecticidal adjuvant and as an effective ingredient a mixture of bis(4-chlorophenyl) sulfone, diphenyl sulfone and a material selected from the group consisting of 4-chlorophenyl phenyl sulfone and 4-bromophenyl phenyl sulfone.

12. A composition of matter effective against arthropod pests containing an inert insecticidal adjuvant as a carrier and as an effective ingredient about 74% 4-chlorophenyl phenyl sulfone, 14% diphenyl sulfone and 12% bis(4-chlorophenyl) sulfone.

References Cited in the file of this patent

UNITED STATES PATENTS

| | | |
|---|---|---|
| 2,148,928 | de Meuron | Feb. 28, 1939 |
| 2,224,964 | Huismann | Dec. 17, 1940 |

FOREIGN PATENTS

| | | |
|---|---|---|
| 220,406 | Switzerland | July 1, 1942 |
| 940,916 | France | Dec. 28, 1948 |

OTHER REFERENCES

Roark et al.: U. S. D. A. Bur. of Ent. and Plant Quar. E–344, p. 29, May 1935.

Metcalf: Journal Economic Entomology, vol. 41, No. 6, December 1948, pp. 875 to 882 (see p. 878).

Questel et al.: U. S. D. A. Bur. of Ent. and Plant Quar. Bull. E–557, entitled "Laboratory and Field Tests of Toxicity of Some Organic Compounds to the European Corn Borer," December 1941, pp. 1–17 (see p. 11).

Lauger et al.: Helv. Chim. Acta, vol. 27, June 1944, pp. 896 to 908.